(No Model.)
W. MASON & W. R. GROAT.
Head for Compound Cutter Bars for Harvesters.
No. 233,866.   Patented Nov. 2, 1880.
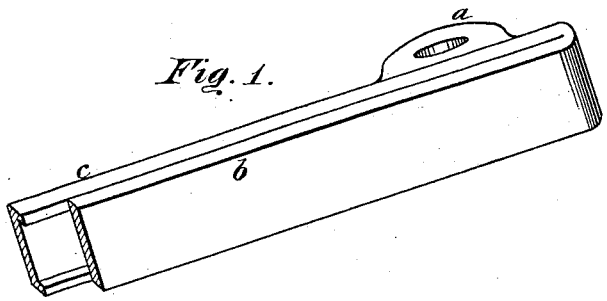
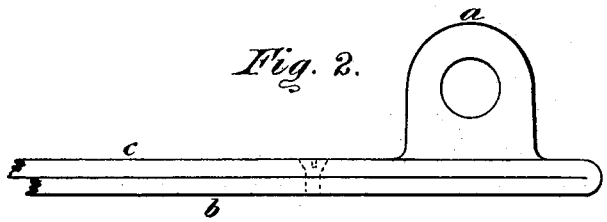
Witnesses:
William M. Ross.
A. Worth.
Inventors:
W. Mason
W. R. Groat,
by J. J. Greenough Atty

United States Patent Office.

WINSLOW MASON AND WILLIAM R. GROAT, OF CANASTOTA, NEW YORK.

HEAD FOR COMPOUND CUTTER-BARS FOR HARVESTERS.

SPECIFICATION forming part of Letters Patent No. 233,866, dated November 2, 1880.

Application filed August 28, 1880. (No model.)

*To all whom it may concern:*

Be it known that we, WINSLOW MASON and WILLIAM R. GROAT, of Canastota, Madison county, in the State of New York, have invented a certain new and Improved Head for Compound Cutter-Bars for Harvesters, the following being a description thereof.

Heretofore various methods have been devised to form a secure, strong, and permanent head to compound cutter-bars, which, so far as we know, have been unsuccessful. To effect this our invention has been made.

In a compound cutter-bar like that patented to J. Montross, 10th August, 1880, or other compound bars, we weld a block, $a$, to the cap $c$, near the inner end, to form a head, as seen in the drawing. We also weld the ends of the bar $b$ and cap $c$ together, doubling them together at $d$, as seen in the drawing. The bar and cap are thus permanently and securely attached at the head end, by which the head-block $a$ is securely held, and the screws that unite the cap $c$ and bar $b$ together when the cutters are between them aid also to secure the stability of the head.

In the Montross bar and others of like compound character it is not necessary to wholly remove the cap, the screws being turned back at the points where the cutters are to be removed, and the cap there sprung up, so as to release them, and uniting the extreme ends of the cap and bar at the head in no way interferes with that operation, while the two parts are greatly strengthened by the union, and the head obtains greater strength and stability from the screws uniting the two parts of the compound bar that are employed to hold the cutter in place.

Having thus described our new cutter-head, we claim—

The combination of the cutter-head and compound cutter-bar by uniting the cap $c$, to which the head-block $a$ is welded, with the bar $b$, as and for the purposes specified.

WINSLOW MASON.
WILLIAM R. GROAT.

Witnesses:
C. L. HOBART,
ORVILLE BELL.